(12) United States Patent
Gehlot et al.

(10) Patent No.: US 12,318,701 B2
(45) Date of Patent: Jun. 3, 2025

(54) SMART ELECTRONIC GAME BOARD

(71) Applicant: Infivention Technologies Pvt. Ltd., Mumbai (IN)

(72) Inventors: Dhiraj Kaluram Gehlot, Ulhasnagar (IN); Atur Mayur Mehta, Mumbai (IN); Bhavya Hitesh Gohil, Mumbai (IN)

(73) Assignee: Infivention Technologies Pvt. Ltd., Mumbai (IN)

( * ) Notice: Subject to any disclaimer, the term of this patent is extended or adjusted under 35 U.S.C. 154(b) by 499 days.

(21) Appl. No.: 17/647,284

(22) Filed: Jan. 6, 2022

(65) Prior Publication Data

US 2022/0241678 A1  Aug. 4, 2022

(30) Foreign Application Priority Data

Jan. 6, 2021 (IN) .............................. 202121000586

(51) Int. Cl.
*A63F 3/00* (2006.01)
*A63F 3/02* (2006.01)

(52) U.S. Cl.
CPC ........ *A63F 3/00643* (2013.01); *A63F 3/0023* (2013.01); *A63F 3/02* (2013.01); *A63F 2003/00258* (2013.01); *A63F 2003/00652* (2013.01)

(58) Field of Classification Search
CPC ...... A63F 3/00643; A63F 3/0023; A63F 3/02; A63F 2003/00258; A63F 2003/00652; A63F 13/245; A63F 13/35; A63F 13/80; A63F 2003/00233; A63F 2009/2454; A63F 2009/2458; A63F 2009/247; A63F 2009/2486; A63F 2009/2488
See application file for complete search history.

(56) References Cited

U.S. PATENT DOCUMENTS

| | | | |
|---|---|---|---|
| 8,923,885 B2 | 12/2014 | Lefevre et al. | |
| 2013/0217496 A1 | 6/2013 | Olkin et al. | |
| 2016/0067594 A1* | 3/2016 | Schwind | A63F 13/2145 |
| | | | 463/31 |
| 2019/0118074 A1* | 4/2019 | Heringer | A63F 3/0023 |
| 2022/0084435 A1* | 3/2022 | Wigh | G09B 19/22 |

FOREIGN PATENT DOCUMENTS

| | | |
|---|---|---|
| CN | 2805853 Y | 8/2006 |
| CN | 101668347 A | 3/2010 |
| CN | 203149701 U | 8/2013 |
| CN | 205730272 U | 11/2016 |
| WO | 2012033863 A1 | 3/2012 |

OTHER PUBLICATIONS

EP Search Report for application No. 22150362.2 mailed on May 24, 2022, pp. 8.

* cited by examiner

*Primary Examiner* — Jeffrey S Vanderveen

(57) ABSTRACT

An electronic game board (106 *a*) that is foldable and rollable includes a processing circuit (302), a play area (206) and indicators (310). Game pieces are arranged on the play area (206) for facilitating a game. Indicators (310) are arranged in the play area (206) and indicate to a player on a first game board an initial and end position of a game piece played by an opponent player on a second game board or by an AI player. The electronic game board (106 *a*) also includes sensors (308) to validate a move of a game piece.

12 Claims, 16 Drawing Sheets

SMART ELECTRONIC GAME BOARD

CROSS-RELATED APPLICATIONS

This application claims priority of Indian Non-Provisional Application No. 202121000586, filed Jan. 6, 2021, the contents of which are incorporated herein by reference.

BACKGROUND

The invention relates generally to game boards, and, more particularly, to a smart electronic game board that is foldable and rollable.

Board games, such as snakes and ladders, chess, go, connect 4, checkers, and ludo, have been played by people of all ages and diversities for several generations. The board games may be played on any physical board, such as a wooden board, or on a computer. When a first player opts to play the board game on a physical board, the first player gets an opportunity to merely play with players that are in the vicinity of the first player. To play with players that are located remotely with respect to the first player, the first player has to rely on a computer.

In the last decade, electronic game boards have become popular owing to the opportunity to play with remote players on a physical board. The first player thus gets an opportunity to play a board game on a physical board with a second player that is located remotely. Such electronic game boards, however, are bulky, and are difficult to store in a place that has an area smaller than the footprint of the electronic game boards. Additionally, the size of electronic game boards for tournaments is fixed, which hinders reduction in size of electronic game boards. Though such electronic game boards are portable, such boards cannot be easily carried from one place to another place because of their bulkiness and storage space requirement.

Thus, it would be advantageous to have an electronic game board that enables a player to play on a physical board with an opponent who is at a remote location, that is not bulky and that is flexible in its storage space requirement.

BRIEF DESCRIPTION OF DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF EMBODIMENTS

The detailed description of the appended drawings is intended as a description of the currently preferred embodiments of the disclosure, and is not intended to represent the only form in which the disclosure may be practiced. It is to be understood that the same or equivalent functions may be accomplished by different embodiments that are intended to be encompassed within the spirit and scope of the disclosure.

In one embodiment of the disclosure, an electronic game board is provided. The electronic game board is foldable and includes a processing circuit, a play area and indicators. Game pieces are arranged on the play area for facilitating a game. Indicators are arranged in the play area such that at least one indicator indicates an initial position on the play area of at least one game piece and an end position on the play area of the at least one game piece based on an input from the processing circuit. The initial position and the end position correspond to a move of the at least one game piece.

In another embodiment of the disclosure, an electronic game board is provided. The electronic game board is flexible and includes a processing circuit, a play area, indicators and sensors. Game pieces are arranged on the play area for facilitating a game. Indicators are arranged in the play area such that at least one indicator indicates an initial position on the play area of at least one game piece and an end position on the play area of the at least one game piece based on an input from the processing circuit. The initial position and the end position correspond to a move of the at least one game piece. The indicators are divided in groups such that each group is a strip of indicators. At least one sensor generates a signal indicative of whether the at least one game piece is moved to the end position.

Various embodiments of the disclosure provide an electronic game board. The electronic game board is foldable and includes a processing circuit, a play area and indicators. Game pieces are arranged on the play area for facilitating a game. Indicators are arranged in the play area such that at least one indicator indicates an initial position on the play area of at least one game piece and an end position on the play area of the at least one game piece based on an input from the processing circuit. The initial position and the end position correspond to a move of the at least one game piece.

The use of indicators to indicate an initial position and an end position of a game piece enables a first player to play a game with a second player located remotely with respect to the first player, a game with an AI player or a game by streaming a match. As the electronic game board is foldable, the electronic game board can be stored in places with storage constraints.

Figure 1:
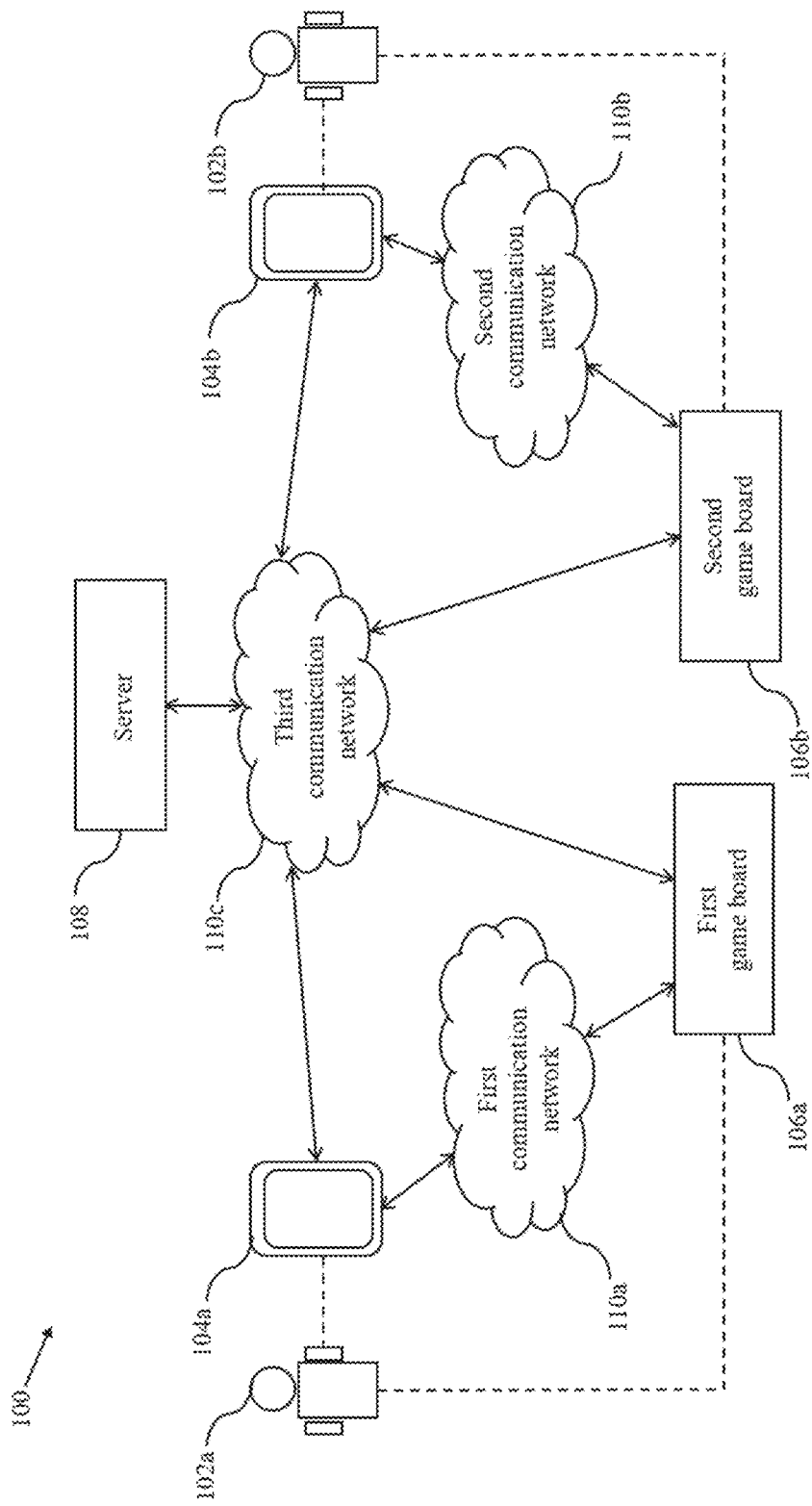
FIG. 1 is a block diagram that illustrates an environment in which various embodiments of the disclosure are practiced.

FIG. 1 is a block diagram that illustrates an environment 100 in which various embodiments of the disclosure are practiced. The environment 100 includes first and second players 102 *a* and 102 *b* and first and second player devices 104 *a* and 104 *b* associated with the first and second players 102 *a* and 102 *b*, respectively. The environment 100 further includes first and second game boards 106 *a* and 106 *b* associated with the first and second players 102 *a* and 102 *b*, respectively, and a server 108. The first and second game boards 106 *a* and 106 *b* are also individually or collectively referred by the numeral 106. The first and second game boards 106 *a* and 106 *b* enable the first and second players 102 *a* and 102 *b* to play various board games. Examples of the board games include, but are not limited to, snakes and ladders, chess, go, connect 4, checkers, and ludo.

The first player device 104 *a* is connected to the first game board 106 *a* by way of a first communication network 110 *a*. Similarly, the second player device 104 *b* is connected to the second game board 106 *b* by way of a second communication network 110 *b*. The first player device 104 *a* and the second player device 104 *b* are connected to each other by way of a third communication network 110 *c*. The first, second and third communication networks 110 *a*-110 *c* are also individually or collectively referred by the numeral 110. Additionally, the first and second game boards 106 *a* and 106 *b* may be connected to each other by way of the third communication network 110 *c*. Further, the server 108 is connected to the first and second player devices 104 *a* and 104 *b* and the first and second game boards 106 *a* and 106 *b* by way of the third communication network 110 *c*. Examples of the first through third communication networks 110 *a*-110 *c* include, but are not limited to, a Bluetooth network, a Bluetooth low energy (BLE) network, a wireless fidelity (Wi-Fi) network, a light fidelity (Li-Fi) network, a local area network (LAN), a wide area network (WAN), a metropolitan area network (MAN), a mobile network such as a cellular data network, a high-speed packet access (HSPA) network, a satellite network, the Internet, a fiber optic network, a coaxial cable network, an infrared (IR) network, a radio frequency (RF) network, and a combination thereof. Various entities in the environment 100 may connect to the first through third communication networks 110 *a*-110 *c* in accordance with various wired and wireless communication protocols, such as Transmission Control Protocol and Internet Protocol (TCP/IP), User Datagram Protocol (UDP), Long Term Evolution (LTE) communication protocols, or any combination thereof.

The first and second players 102 *a* and 102 *b* are individuals who wish to play a board game (such as chess). In an embodiment, the first and second players 102 *a* and 102 *b* use the respective first and second player devices 104 *a* and 104 *b* to perform various activities. For example, the first player 102 *a* uses the first player device 104 *a* to initiate the board game. To initiate the board game, the first player 102 *a* selects a game mode by way of the first player device 104 *a*. Various modes of input used by the first player 102 *a* to select the game mode may include, but are not limited to, a touch-based input, a text-based input, a voice-based input, a gesture-based input, or a combination thereof.

The selected game mode on the first player device 104 *a* may be one of first, second, third, fourth and fifth game modes. In an embodiment, the first game mode is a 'Play with Friends' game mode, the second game mode is a 'Play with AI' game mode, the third game mode is a 'Stream Games' game mode, the fourth game mode is an 'Analyze match' game mode, and the fifth game mode is a 'Victor' game mode. The first player 102 *a* may select the first game mode when the first player 102 *a* wishes to play with another player (e.g., the second player 102 *b*) who is at a different location as compared to the first player 102 *a*. The first player 102 *a* may select the second game mode when the first player 102 *a* wishes to play with an artificial intelligence (AI) player (e.g., a computer). The first player 102 *a* may select the third game mode when the first player 102 *a* wishes to stream matches of various board games (i.e., ludo matches, checker matches, chess matches, and the like) that may be live or recorded. The first player 102 *a* selects the fourth game mode when the first player 102 *a* wishes for the moves of the match to be analyzed. The first player 102 *a* selects the fifth game mode when the first player 102 *a* wishes to learn the match rules or learn how to play a match. The fourth game mode can be selected in conjunction with any of the first, second, third and fifth game modes. The fifth game mode can be selected in conjunction with any of the first, second, third and fourth game modes.

In an embodiment when the board game is chess, the first game board 106 *a* is a chessboard and includes two sets of game pieces such as a black set of game pieces and a white set of game pieces, each of which includes 16 game pieces used for playing chess. Further, each of the black and white set of game pieces may include additional game pieces, such as additional queens, additional rooks, additional bishops, additional knights, and the like. In an embodiment, each game piece includes a magnet at a bottom part of the game piece. Examples of the magnet include a neodymium magnet and a ferrite magnet.

The second game board 106 *b* is structurally similar to the first game board 106 *a*. Further, various functionalities and operations of the second game board 106 *b* are similar to functionalities and operations of the first game board 106 *a*. The first game board 106 *a* is explained in detail in conjunction with FIGS. 2-4.

The server 108, the first player device 104 *a*, the second player device 104 *b*, the first game board 106 *a*, and the second game board 106 *b* may include suitable logic, circuit, interfaces, and/or code, executable by respective circuits, that may be configured to perform one or more operations for playing the board game. The server 108 is a computing device, a software framework, or a combination thereof, that may provide a generalized approach to create the server implementation. In an embodiment, various operations of the server 108, the first player device 104 *a*, the second player device 104 *b*, the first game board 106 *a*, and the second game board 106 *b* may be dedicated to execution of procedures, such as, but not limited to, programs, routines, or scripts stored in respective memories (not shown) for supporting respective applied applications. In an embodiment, the server 108 renders various User Interfaces (UIs) on the first and second player devices 104 *a* and 104 *b* or a display on a game board (for example, the first game board 106 *a*). The various UIs are used to initiate the board game. In an embodiment, the various UIs are rendered on the first player device 104 *a* or a display on the first game board 106 *a* by a processing circuit of the first player device 104 *a* or the second player device 104 *b*. In another embodiment, the various UIs are rendered on the first player device 104 *a* or a display on the first game board 106 *a* by a processing circuit of the first game board 106 *a* or the second game board 106 *b*. In an embodiment, the various UIs used to initiate the board game are explained in detail in conjunction with FIGS. 5A-5E.

The server 108 receives the moves played by the first player 102 *a* by way of the first game board 106 *a*. The server 108 may include an AI engine to generate counter moves or analyze the match.

The server 108 may be connected to a third-party server (not shown) for receiving information associated with various live or recorded matches. Alternatively, the information associated with the various recorded matches may be stored in a memory associated with the server 108. In an embodiment, when the board game is played in the third game mode, the server 108 sequentially transmits the set of moves that are played in the selected match to the first game board 106 *a*. The server 108 may be realized through various web-based technologies, such as, but not limited to, a Java web-framework, a .NET framework, a PHP framework, a python framework, or any other web-application framework. Examples of the server 108 include, but are not limited to, a personal computer, a laptop, or a network of computer systems. In other embodiments, the information associated with live matches and recorded matches may be stored in a memory associated with the first player device 104 *a* or in a memory associated with the first game board 106 *a*.

Figure 2A:
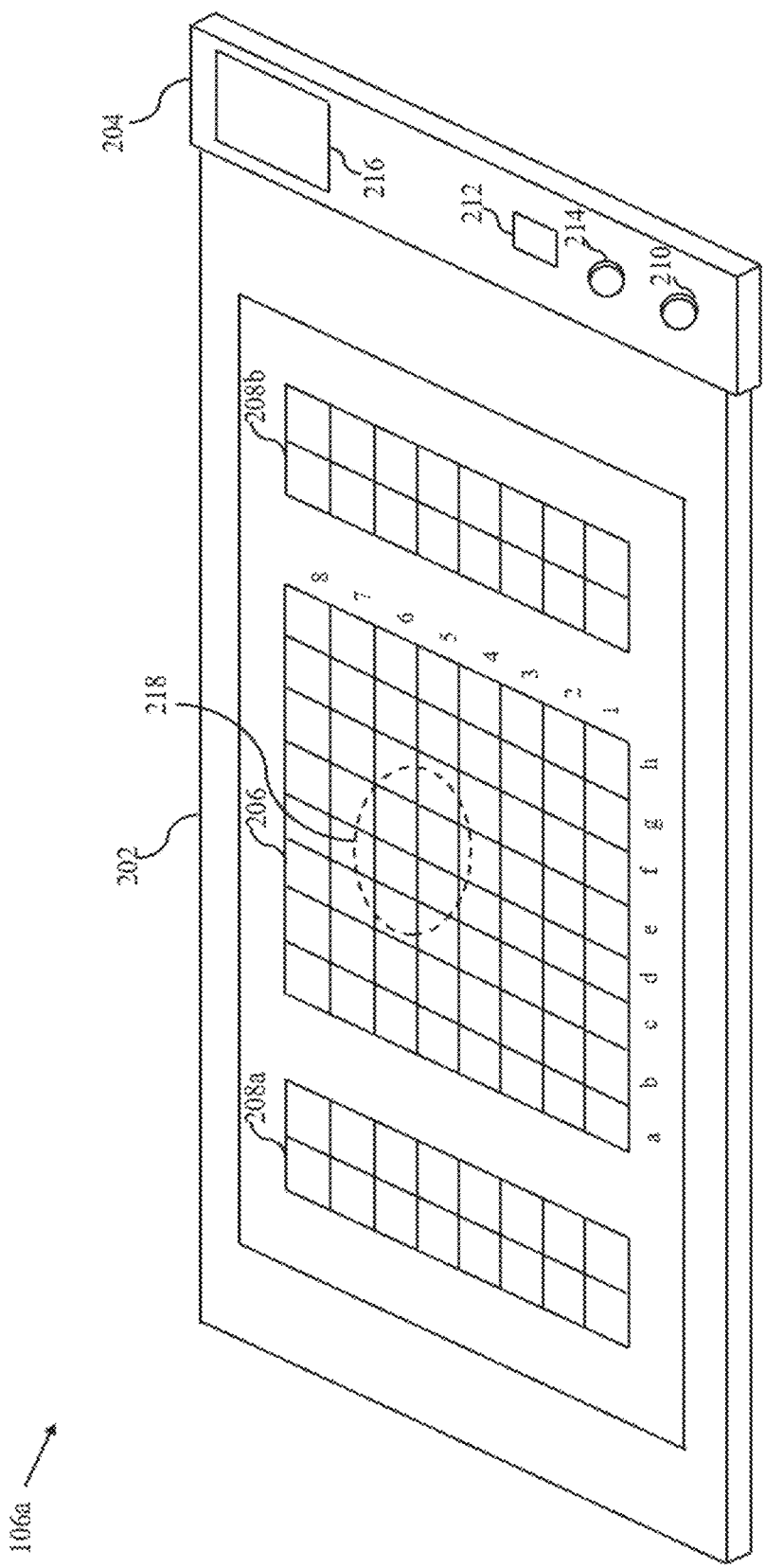
FIG. 2A illustrates a first game board of the environment of FIG. 1, in accordance with an embodiment of the disclosure.

FIG. 2A illustrates the first game board 106 *a*, in accordance with an embodiment of the disclosure. The first game board 106 *a* includes a play region 202 and a control circuit 204. The play region 2*i*02 includes a play area 206 and first and second parking areas 208 *a* and 208 *b*. The control circuit 204 includes a switch 210, and a power connector 212. In an embodiment, the control circuit 204 also includes an indicating unit 214 and a display 216.

In an embodiment, the play area 206 is an 8×8 grid of 64 squares onto which the game pieces are arranged. Eight rows of the 8×8 grid are denoted with numbers '1' to '8'. Similarly, eight columns of the 8×8 grid are denoted with letters 'a' to 'h'. Each square of the 64 squares is uniquely identified based on a number of the row and a letter of the column. For example, a square corresponding to a first row and a first column is denoted as 'a1'. Each of the black and white sets of game pieces includes 16 game pieces and are placed on two rows on each end of the play area 206 (such as row '1' and row '2' for the white set of game pieces, and row '7' and row '8' for the black set of game pieces) at the initiation of the board game.

The first and second parking areas 208 *a* and 208 *b* have 16 squares each, i.e., one square for arranging one of the 16 game pieces of the black and white sets of game pieces. In an embodiment, the first parking area 208 *a* is for the black set of game pieces, and the second parking area 208 *b* is for the white set of game pieces. In another embodiment, the first parking area 208 *a* is for the white set of game pieces, and the second parking area 208 *b* is for the black set of game pieces. When a game piece is removed from the game, the game piece can be placed in the respective parking area 208 *a* or 208 *b*.

In an embodiment, the switch 210 is a mechanical switch used to switch ON or switch OFF the first game board 106 *a*. When the switch 210 is closed, the first game board 106 *a* is switched ON. When the switch 210 is open, the first game board 106 *a* is switched OFF. In an embodiment, the switch 210 includes a light emitting diode (LED) (not shown) for indicating whether the first game board 106 *a* is switched ON or switched OFF. The LED may further indicate the selected game mode. In an example, when the first through fifth game modes are selected, the LED operates at first through fifth speeds, respectively. In another embodiment, the LED uses different colors to indicate the game mode selected. Other examples of the switch 210 include a single pole single throw switch, a toggle switch, a push button switch, and the like.

The power connector 212 is used to connect an external power supply circuit (not shown) to the first game board 106 *a* for supplying power. In an embodiment, the power connector 212 is a Universal Serial Bus (USB) port. The power connector 212 can as well be used to connect the first game board 106 *a* to a computer (not shown). The computer can be used to stream matches or display on its screen the match being played on the first game board 106 *a*. The computer can include an AI engine to enable the second game mode. The computer can also analyze the moves of the match. The external power supply circuit may supply a direct current (DC) power or an alternating current (AC) power. In an embodiment, the first game board 106 *a* includes a battery (not shown) for supplying power to the first game board 106 *a*. Examples of the battery include a lithium ion (Li-ion) battery, a nickel cadmium (Ni—Cd) battery, and the like. In an embodiment, the battery is a rechargeable battery which is charged by the external power supply circuit. In another embodiment, the battery is a non-rechargeable battery.

The indicating unit 214 indicates occurrences of various events such as power on, movement of the game pieces, invalid moves, and the like. For example, the indicating unit 214 indicates whether a game piece is moved to an invalid position or is not moved to one of its valid positions within a predetermined time period. Examples of the indicating unit 214 include, but are not limited to, an audio device, a video device, and a light emitting diode. In an embodiment, the first game board 106 *a* includes three indicating units (not shown) similar to the indicating unit 214. For example, a first indicating unit of the three indicating units indicates whether the first game board 106 *a* is connected to an external power supply or not and the current charge state of the battery (if any). A second indicating unit of the three indicating units indicates whether the first game board 106 *a* is connected to a communication network such as a BLE network or a Wi-Fi network. In an embodiment, the second indicating unit of the three indicating units indicates whether the first game board 106 *a* is connected to the second game board 106 *b*. A third indicating unit of the three indicating units indicates whether a game piece is moved to an invalid position, whether a game piece is not moved to a valid position within a predetermined time period, whether a game piece is missing or has fallen over, and whether a game piece is missing.

The display 216, instead of the first player device 104 *a*, can be used to show the various UIs used to initiate and play the board game. In an embodiment, the display 216 includes the functionality of the indicating unit 214. The display 216 can also be used to select various settings associated with a match and the first game board 106 *a*. The display 216 can also be used to display information related to the first game board 106 *a*, the second game board 106 *b*, the first player 102 *a*, and the second player 102 *b*, the first player device 104 *a* and the second player device 104 *b*. In an embodiment, the display 216 displays the match being played on the first game board 106 *a*.

In an embodiment, the play region 202 is made of a flexible material. Examples of the flexible material include, but are not limited to, fiber, plastic, silicone, rubber, polymer, cloth, fabric and rexine. In another embodiment, the play region 202, and the region of the first game board 106 *a* that includes the control circuit 204 are flexible and made of one of the materials including, but not limited to, fiber, plastic, silicone, rubber, polymer, cloth, fabric and rexine. In an embodiment, the first game board 106 *a* is rollable.

Figure 2B:
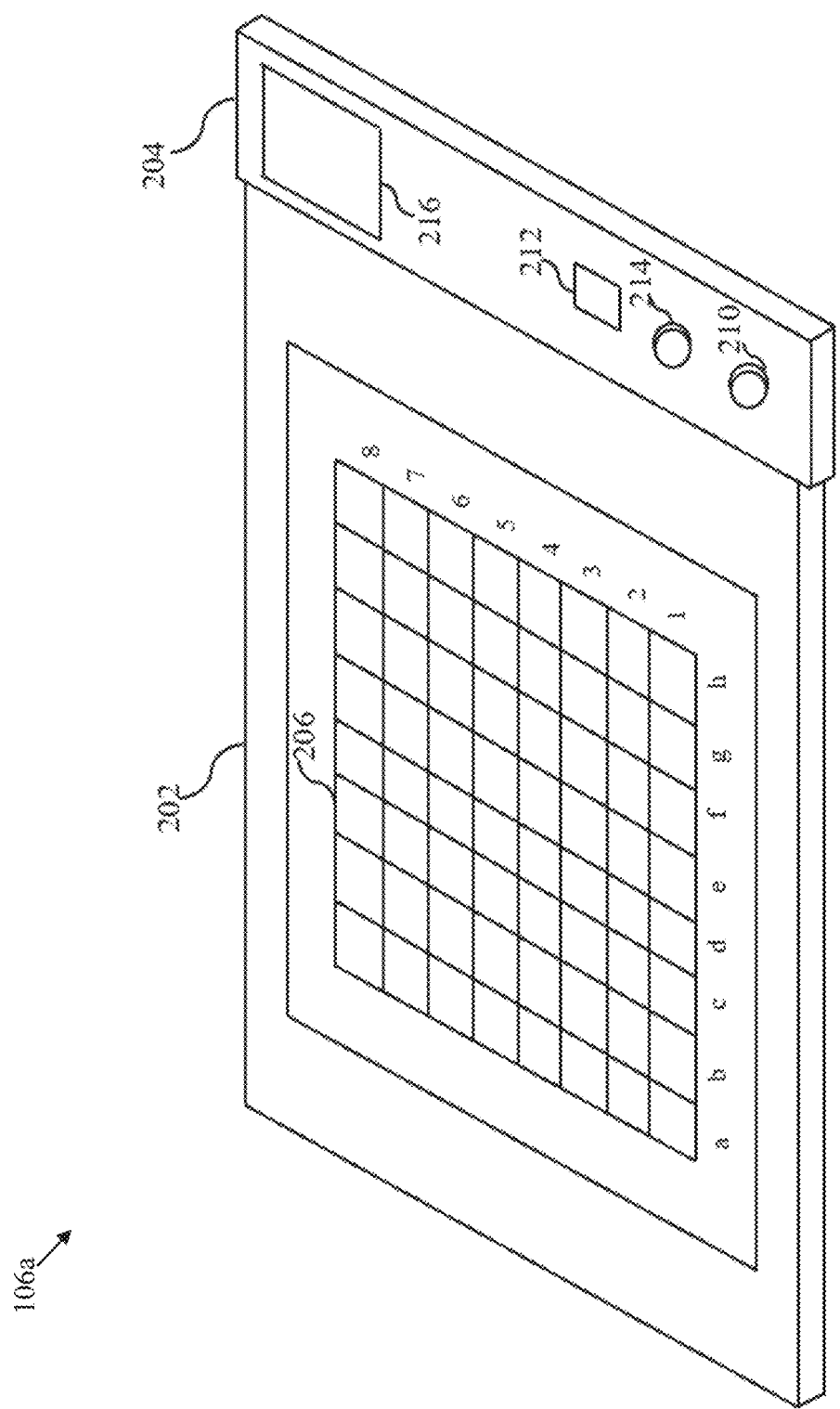
FIG. 2B illustrates the first game board, in accordance with another embodiment of the disclosure.

FIG. 2B illustrates the first game board 106 *a*, in accordance with another embodiment of the disclosure. The difference between the first game board 106 *a* of FIG. 2A and the first game board 106 *a* of FIG. 2B is that the first and second parking areas 208 *a* and 208 *b* are absent in the first game board 106 *a* illustrated in FIG. 2B.

Figure 2D:
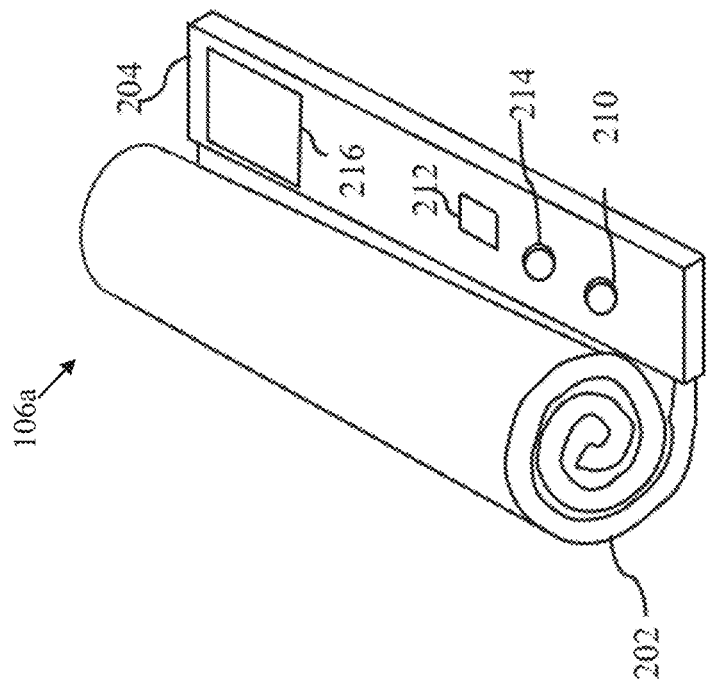
FIG. 2D illustrates the first game board, showing that the first game board is rollable, in accordance with another embodiment of the disclosure.
Figure 2C:
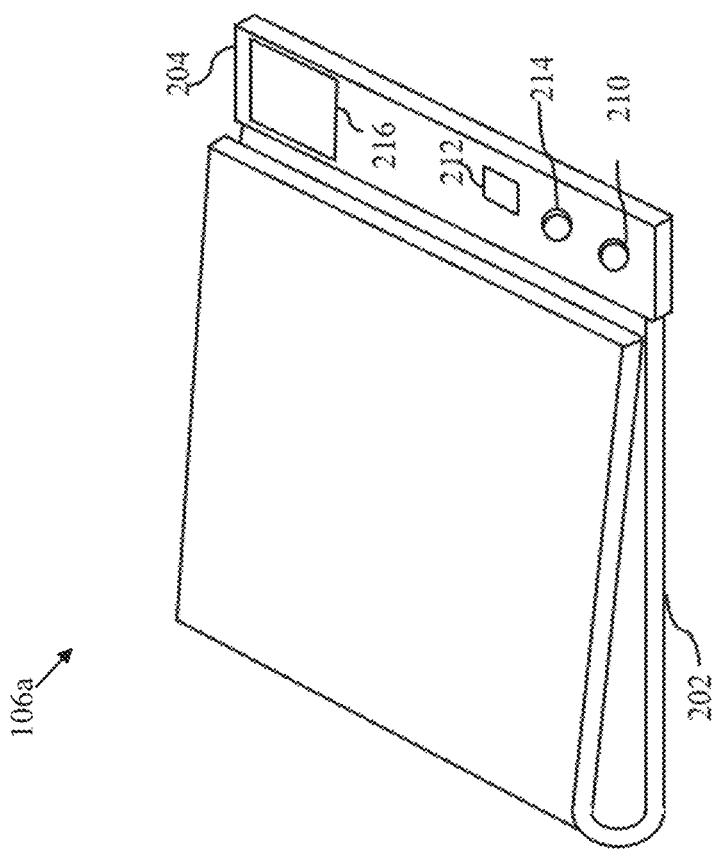
FIG. 2C illustrates the first game board, showing that the first game board is foldable, in accordance with an embodiment of the disclosure.

FIG. 2C illustrates the first game board 106 *a* of FIG. 2A or FIG. 2B, showing that the first game board 106 *a* is foldable, in accordance with an embodiment of the disclosure. FIG. 2D illustrates the first game board 106 *a* of FIG. 2A or FIG. 2B, showing that the first game board 106 *a* is rollable, in accordance with an embodiment of the disclosure.

Figure 3:
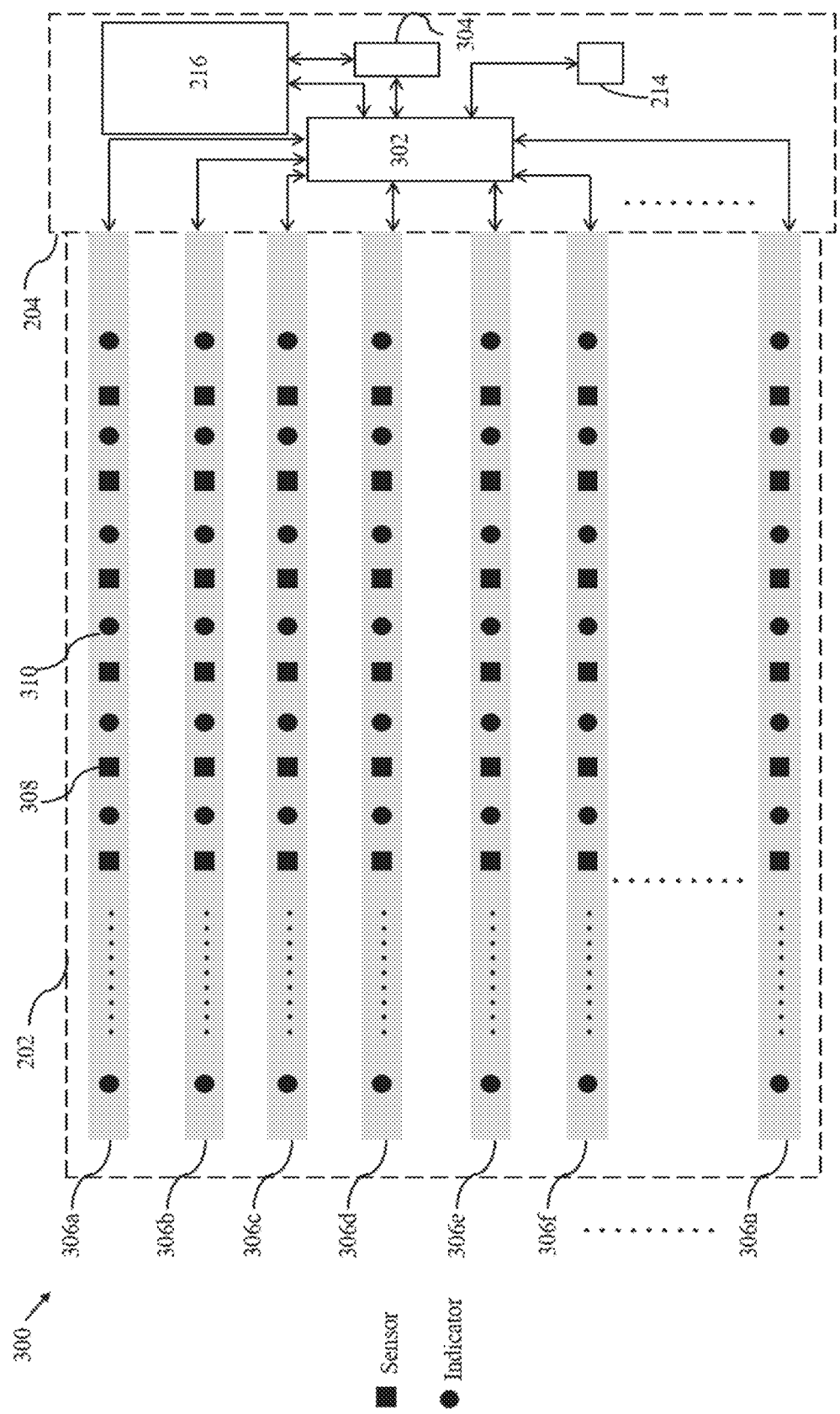
FIG. 3 shows a block diagram of a circuitry of the first game board, in accordance with an embodiment of the disclosure.

FIG. 3 shows a block diagram of a circuitry 300 of the first game board 106 *a*. The first game board 106 *a* includes a processor 302, a memory 304, the indicating unit 214 and the display 216. The processor 302, the memory 304, the indicating unit 214 and the display 216 are part of the control circuit 204. Examples of the processor 302 include, but are not limited to, an application-specific integrated circuit (ASIC) processor, a reduced instruction set computing (RISC) processor, a complex instruction set computing (CISC) processor, and a field-programmable gate array (FPGA). It will be apparent to a person having ordinary skill in the art that the processor 302 is compatible with multiple operating systems. The first game board 106 *a* also includes strips 306 below or on the surface of the play region 202. Each strip 306 includes respective sensors 308 and respective indicators 310. Examples of sensors 308 include, but are not limited to, electromagnetic devices, digital hall sensors, analog hall sensors, Near-Field Communication (NFC) readers, capacitive sensors, surface acoustic wave sensors, optical sensors and resistive sensors. An example of indicators 310 includes, but is not limited to, a light emitting diode. In an embodiment, each strip 306 is made of a flexible Printed Circuit Board (PCB). The numeral 306 refers to a single strip of indicators or multiple strip of indicators. The numeral 308 refers to a single sensor or multiple sensors. The numeral 310 refers to a single indicator or multiple indicators. In an embodiment, rather than including multiple flexible strips 306, the first game board 106 *a* includes a single flexible sheet which includes all the sensors 308 and the indicators 310 required for the functioning of the first game board 106 *a*. In an embodiment, the single flexible sheet is a flexible PCB.

The processor 302 is connected to each sensor 308 and each indicator 310, the memory 304, the indicating unit 214 and the display 216. In the first game mode, the sensors 308 identify an initial position and an end position of a game piece moved by the first player 102 *a* on the first game board 106 *a* and communicate the initial and end positions of the game piece to the processor 302. The processor 302 communicates the initial and end positions of the game piece to a game board of an opponent player (for example, the second game board 106 *b*). In an embodiment, the processor 302 communicates the initial and end positions of the game piece to a player device of an opponent player (for example, the second player device 104 *b*). The indicators 310 on the opponent game board then indicate the initial and end positions of a game piece corresponding to the game piece moved by the first player 102 *a* on the first game board 106 *a*. In an embodiment, the indicators 310 indicate whether a game piece is missing, whether a game piece has fallen over and its position, and whether a move is invalid and the wrongly moved game piece. The indicators 310 also indicate where can a wrongly moved game piece be moved to make the move a valid move.

In the second game mode, the opponent player is an AI player. In the second game mode, when the first player 102 *a* of the first game board 106 *a* moves a game piece, the sensors 308 identify an initial position and an end position of the game piece and communicate the initial and end positions of the game piece to the processor 302. The processor 302 communicates the initial and end positions of the game piece to the AI player. The AI player determines the counter move and communicates the counter move to the processor 302. The processor 302 then communicates an initial position and an end position of a game piece corresponding to the counter move determined by the AI player to the respective indicators 310 on the first game board 106 *a*. In an embodiment, an AI engine associated with the AI player is included in the first player device 104 *a*. In another embodiment, the AI engine is included in the first game board 106 *a*. In yet another embodiment, the AI engine is included in a computer (not shown) to which the first game board 106 *a* is connected using the power connector 212. In other embodiments, the AI engine is included in the server 108. It will be understood by a person having ordinary skill in the art that the AI engine can be a combination of various AI engines present in the first player device 104 *a*, the second player device 104 *b*, the first game board 106 *a*, the second game board 106 *b*, the server 108, and the computer to which the first game board 106 *a* is connected using the power connector 212.

In the third game mode, the indicators 310 indicate initial and end positions of the various moves associated with a match selected by the first player 102 *a* based on inputs from the processor 302 or the first player device 104 *a* or the server 108. The sensors 308 identify the initial and end positions of the game piece moved and communicate the initial and end positions to the processor 302.

In the fourth game mode, the sensors 308 identify any move of a game piece by the first player 102 *a* or the second player 102 *b* and communicate information related to the move to the processor 302. The processor 302 then communicates the moves to an AI unit that analyzes the moves and provides feedback to the players associated with the match (for example, the first and second players 102 *a* and 102 *b*. In an embodiment, in the fourth game mode, the AI unit also provides points and ratings to the players associated with the match. The fourth game mode can be selected in conjunction with any of the first, second, third and fifth game modes. It will be understood by a person having ordinary skill in the art that the AI unit associated with the fourth game mode is included in the first player device 104 *a* or the second player device 104 *b* or the first game board 106 *a* or the second game board 106 *b* or the server 108 or a combination of these. In an embodiment, the AI unit is included in a computer (not shown) to which the first game board 106 *a* is connected using the power connector 212. In another embodiment, the AI engine associated with the second game mode acts as the AI unit when the fourth game mode is selected. The indicators 310 indicate a move played by the opponent player. When the fourth game mode is selected either alone or in conjunction with any other game mode, the same game board (for example, the first game board 106 *a*) can be used by both the first and second players 102 *a* and 102 *b*.

In the fifth game mode, the sensors 308 identify any move of a game piece by the first player 102 *a* or the second player 102 *b* and communicate the information related to the move to the processor 302. The indicators 310 indicate the movement of a game piece moved by the opponent player. An AI module associated with the fifth game mode teaches how to play a match. For example, the AI module teaches with the help of indicators 310 the valid movements of each game piece. The AI module can also suggest various steps that can be played in a match. The fifth game mode can be selected in conjunction with any of the first, second, third and fourth game modes. It will be understood by a person having ordinary skill in the art that the AI module associated with the fifth game mode is included in the first player device 104 *a* or the second player device 104 *b* or the first game board 106 *a* or the second game board 106 *b* or the server 108 or a combination of these. In an embodiment, the AI module is included in a computer (not shown) to which the first game board 106 *a* is connected using the power connector 212. In another embodiment, the AI engine associated with the second game mode acts as the AI module when the fifth game mode is selected. In yet another embodiment, the AI unit associated with the fourth game mode acts as the AI module when the fifth game mode is selected. When the fifth game mode is selected either alone or in conjunction with any other game mode, the same game board (for example, the first game board 106 *a*) can be used by both the first and second players 102 *a* and 102 *b*.

In any of the first, second, third, fourth and fifth game modes, when the first player 102 *a* of the first game board 106 *a* moves a game piece indicated by the indicators 310, the respective sensors 308 sense and communicate to the processor 302 the initial position from which the game piece was moved and the end position the game piece was moved to. The processor 302 then determines whether the movement of the game piece is valid or not. If the movement is not valid, the processor 302 sends a command to the indicating unit 214 or the display 216 or to both to indicate to the first player 102 *a* about the invalid move. In an embodiment, the processor 302 sends a command to indicators 310, which then indicate the game piece that was not moved to a valid position. The indicators 310 can also indicate the position to which the incorrectly moved game piece should be moved back. In an embodiment, the sensor 308 detects a move, identifies the game piece that is moved, and communicates a signal indicative of the start and end positions of the game piece moved and unique identify of the game piece to the processor 302. In another embodiment, the sensors 308 identify the moves and communicates a signal indicative of the start and end positions of the game pieces associated with moves to the processor 302. The processor 302 then tracks to identify which game pieces are moved and whether the moves are valid or not. It will be understood by a person having ordinary skill in the art that the step of determining whether a move is valid or not and the step of identifying the game pieces that are moved can as well be performed by the first player device 104 *a* or the second player device 104 *b* or the first game board 106 *a* or the second game board 106 *b* or the server 108 or the computer to which the first game board 106 *a* is connected using the power connector 212 or a combination of these.

In an embodiment, in any of the first, second, third, fourth and fifth game modes, if a player makes a valid move different from the ones suggested to the player by the indicators 310 or the AI player or the AI unit or the AI module, the move is considered valid.

The memory 304 is connected to the processor 302 and includes suitable logic, circuitry, and/or interfaces to store one or more instructions that are executed by the processor 302 to perform its operations. The memory 304 stores the moves associated with a game. The memory 304 further stores position information of each game piece on the first game board 106 *a* and a status of the game. The status of the game is information about the stage of the game such as 'in-play', 'draw', 'stale-mate', 'check-mate', and the like. Examples of the memory 304 include, but are not limited to, a random-access memory (RAM), a read-only memory (ROM), a programmable ROM (PROM), and an erasable PROM (EPROM).

Figure 4B:
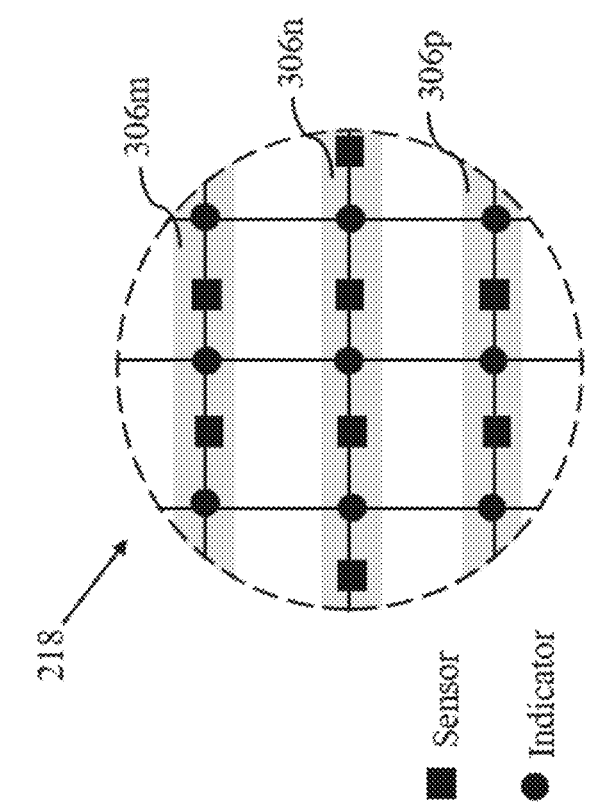
FIG. 4B illustrates an arrangement of the strips with respect to the play area of the first game board, in accordance with another embodiment of the disclosure.
Figure 4A:
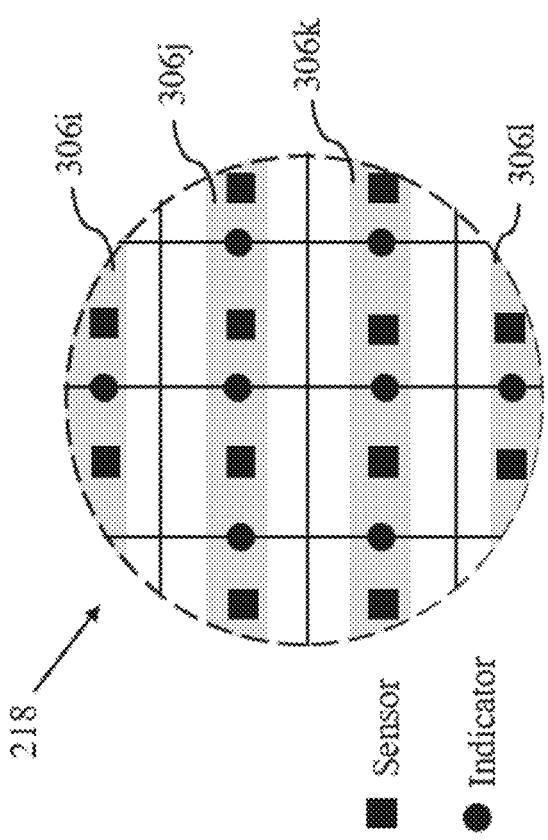
FIG. 4A illustrates an arrangement of strips with respect to a play area of the first game board, in accordance with an embodiment of the disclosure.

FIGS. 4A and 4B illustrate two arrangements of the strips 306 with respect to the 8×8 grid in the play area 206 of the first game board 106 *a*. For the sake of simplicity, the arrangement of the strips 306 with respect to the 8×8 grid is shown for only an area 218 shown in FIG. 2A. The arrangements of FIGS. 4A and 4B relate to embodiments that include multiple strips 306. In another embodiment, the first game board 106 *a*, rather than including multiple flexible strips 306, includes a single flexible sheet that includes all the sensors 308 and the indicators 310 required for the functioning of the first game board 106 *a*. In an embodiment, the single flexible sheet is a flexible PCB.

In FIG. 4A, the strips 306 are arranged at the centre of each row 1 through 8 of the 8×8 grid such that the sensors 308 are positioned at the centre of each square in the 8×8 grid, and the indicators 310 are positioned at the centre of two edges of each square in the 8×8 grid. Thus, in the embodiment of FIG. 4A, the first gaming board 106 *a* includes 8 strips 306. Each strip 306 includes 8 sensors 308 and 9 indicators 310. In FIG. 4B, the strips 306 are arranged at two edges of each row 1 through 8 of the 8×8 grid such that the indicators 310 are positioned at the vertices of each square in the 8×8 grid, and the sensors 308 are positioned at the centre of two edges of each square in the 8×8 grid. Thus, in the embodiment of FIG. 4B, the first gaming board 106 *a* includes 9 strips 306. Each strip 306 includes 8 sensors 308 and 9 indicators 310. It will be apparent to a person having ordinary skill in the art that various arrangements of the sensors 308 and the indicators 310 are possible in a strip 306 and that various arrangements of the strips 306 with respect to the play area 206 are possible. For example, in an embodiment in which the first game board 106 *a* includes multiple strips 306, each square includes an indicator 310 at each of its four vertices and a sensor 308 at the centre of the square. In another embodiment in which the first game board 106 *a* includes multiple strips 306, each square includes an indicator 310 at each of its four vertices and a sensor 308 at the centre of each of its four edges. In yet another embodiment in which the first game board 106 *a* includes multiple strips 306, each square includes a sensor 308 at each of its four vertices and an indicator 310 at the centre of the square. In yet another embodiment in which the first game board 106 *a* includes multiple strips 306, each square includes a sensor 308 at each of its four vertices and an indicator 310 at the centre of each of its four edges. In an embodiment in which the first game board 106 *a* includes a single flexible sheet, instead of multiple strips 306, with all the sensors 308 and the indicators 310 required for the functioning of the first game board 106 *a*, each square includes an indicator 310 at each of its four vertices and a sensor 308 at the centre of the square. In another embodiment in which the first game board 106 *a* includes a single flexible sheet, instead of multiple strips 306, with all the sensors 308 and the indicators 310 required for the functioning of the first game board 106 *a*, each square includes an indicator 310 at each of its four vertices and a sensor 308 at the centre of each of its four edges. In yet another embodiment in which the first game board 106 *a* includes a single flexible sheet, instead of multiple strips 306, with all the sensors 308 and the indicators 310 required for the functioning of the first game board 106 *a*, each square includes a sensor 308 at each of its four vertices and an indicator 310 at the centre of the square. In yet another embodiment in which the first game board 106 *a* includes a single flexible sheet, instead of multiple strips 306, with all the sensors 308 and the indicators 310 required for the functioning of the first game board 106 a, each square includes a sensor 308 at each of its four vertices and an indicator 310 at the centre of each of its four edges.

FIGS. 5A-5E illustrate various UIs used to initiate a board game and play the board game. For the sake of explanation, in this embodiment, the UIs are rendered by the server 108 on the first player device 104 a.

Figure 5A:
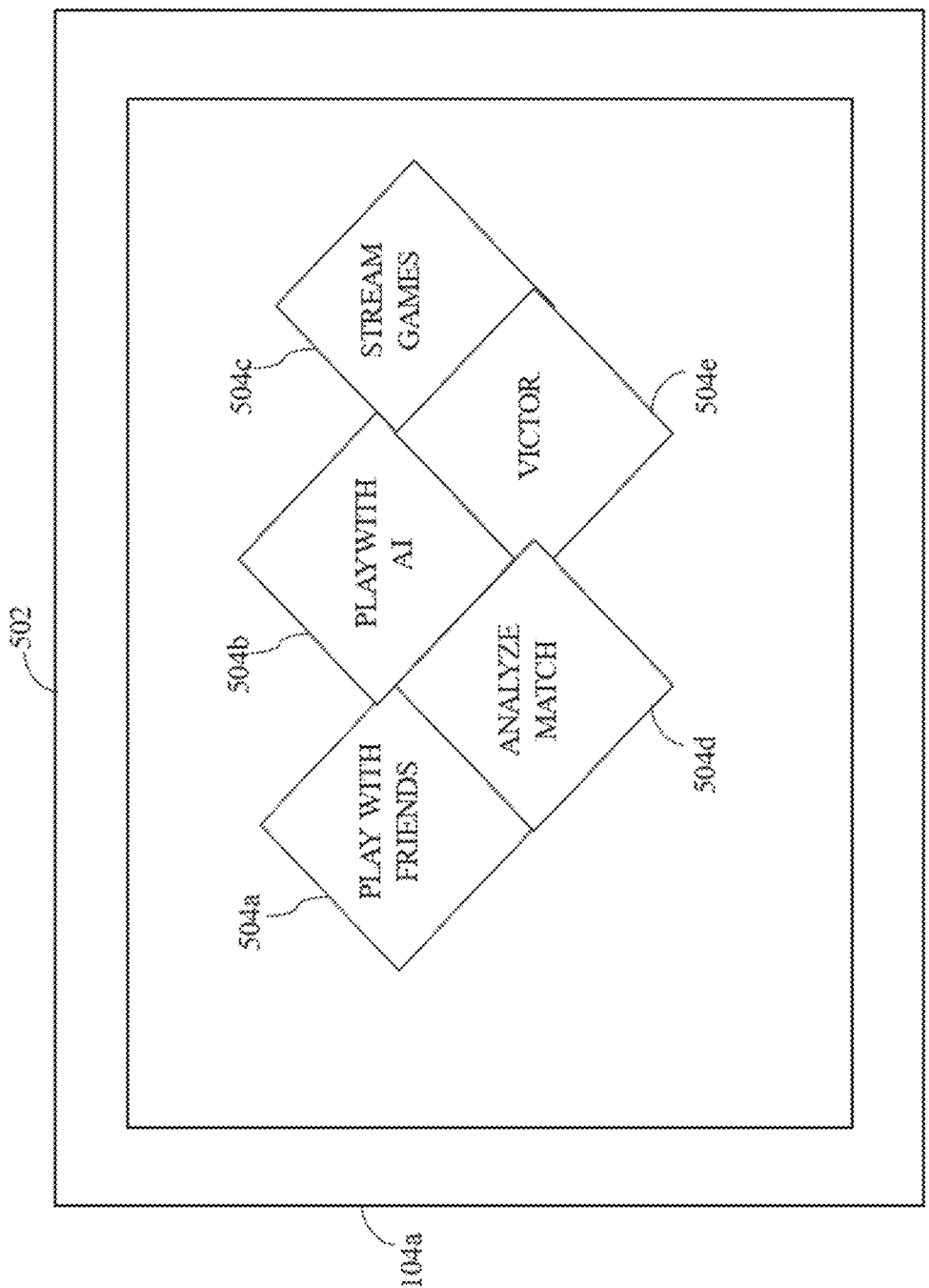
FIGS. 5A-5E illustrate first through fifth user interfaces (UIs) rendered on a first player device of the environment of FIG. 1, in accordance with an embodiment of the disclosure.

FIG. 5A illustrates an UI 502 rendered on the first player device 104 a, in accordance with an embodiment of the disclosure. The server 108 renders the first UI 502 on the first player device 104 a, when the first player 102 a initiates the board game. The first UI 502 presents the first through fifth game modes that are selectable by the first player 102 a. The first UI 502 includes first through fifth options 504 a-504 e for the first through fifth game modes, respectively. The first option 504 a is the 'Play with Friends' option that is selectable by the first player 102 a to play the board game with another player (such as the second player 102 b). The second option 504 b is the 'Play with AI' option that is selectable by the first player 102 a to play the board game with the AI player. The third option 504 c is the 'Stream Games' option that is selectable by the first player 102 a to stream the selected match on the first game board 106 a. The fourth option is the 'Analyze Match' option that is selectable by the first player 102 a when the first player 102 a wishes to receive feedback, points and ratings for the match. The fifth option is the 'Victor' option that is selectable by the first player 102 a when the first player 102 a wishes to learn the match rules or learn how to play a match.

Figure 5B:
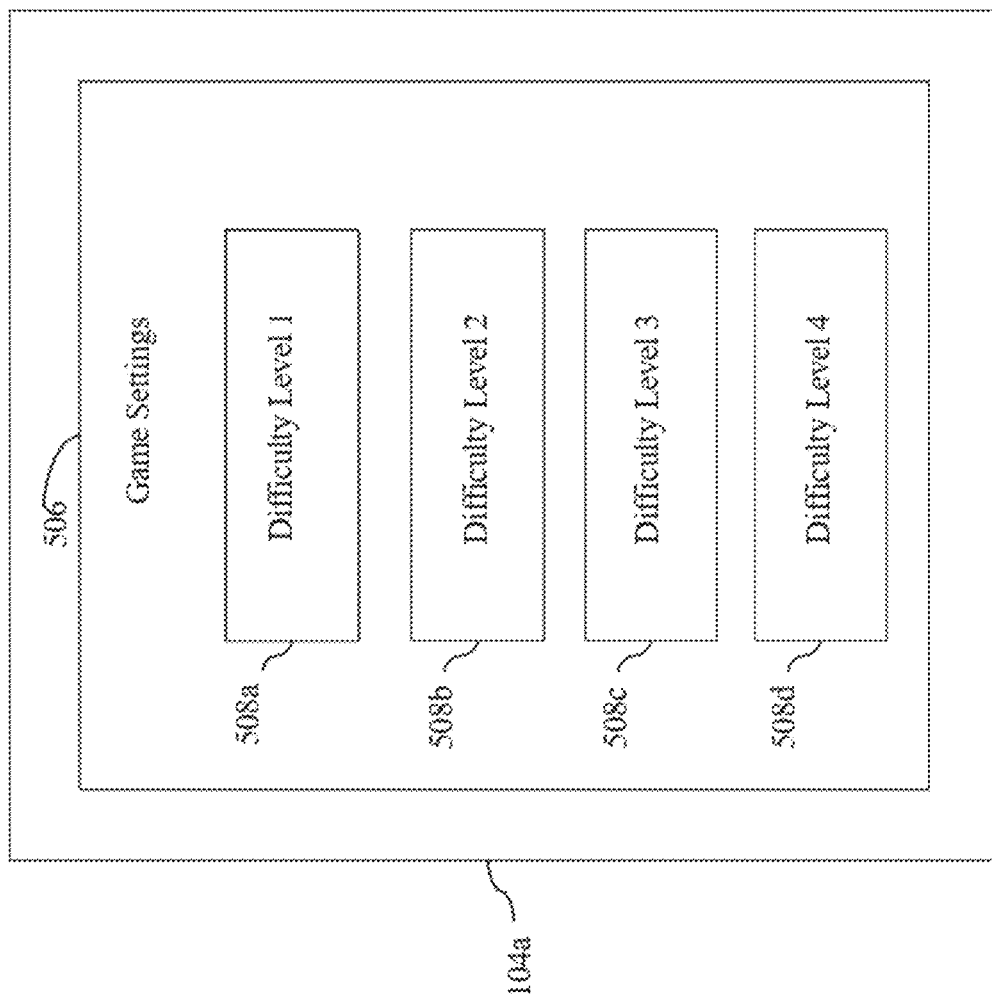

FIG. 5B illustrates the second UI 506 rendered on the first player device 104 a, in accordance with an embodiment of the disclosure. The server 108 renders the second UI 506 when the first player 102 a selects the first game mode or the second game mode. The second UI 506 presents the set of difficulty levels that are selectable by the first player 102 a. The second UI 506 includes fourth through seventh options 508 a-508 d for selecting a corresponding difficulty level of the board game. The fourth through seventh options 508 a-508 d indicate first through fourth difficulty levels, respectively. In an embodiment, the fourth option 508 a has the least difficulty as compared to the fifth through seventh options 508 b-508 d.

Figure 5C:
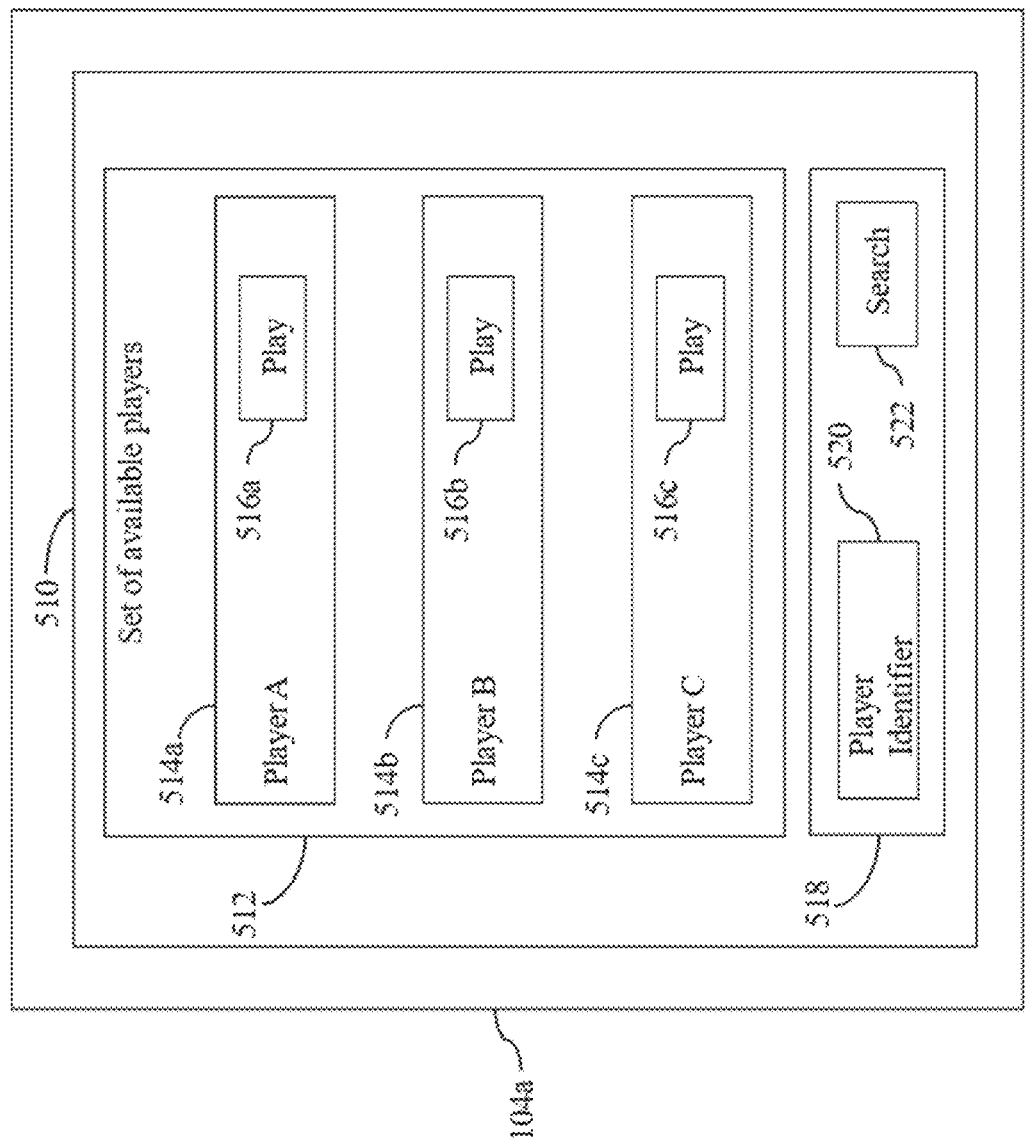

FIG. 5C illustrates the third UI 510 rendered on the first player device 104 a, in accordance with an embodiment of the disclosure. The server 108 renders the third UI 510 when the first player 102 a selects the first game mode. The third UI 510 presents the set of available players that are selectable by the first player 102 a in a set of available players section 512. The set of available players section 512 includes first through third player information sections 514 a-514 c. The first through third player information sections 514 a-514 c include the corresponding player name (such as 'Player A', 'Player B', or 'Player C'), nationality of the players, number of matches won by the players, rating of the players, and the like. Further, the first through third player information sections 514 a-514 c include eighth through tenth options 516 a-516 c, respectively. The eighth through tenth options 516 a-516 c are 'Play' options that are selectable by the first player 102 a to play the board game with the corresponding player. Additionally, the third UI 510 presents a manual search section 518. The manual search section 518 includes a 'Player Identifier' section 520 and an eleventh option 522. The first player 102 a enters the player ID of the preferred opponent player in the 'Player Identifier' section 520. The eleventh option 522 is a 'Search' option that is selectable by the first player 102 a to search for the preferred opponent player based on the player ID.

Figure 5D:
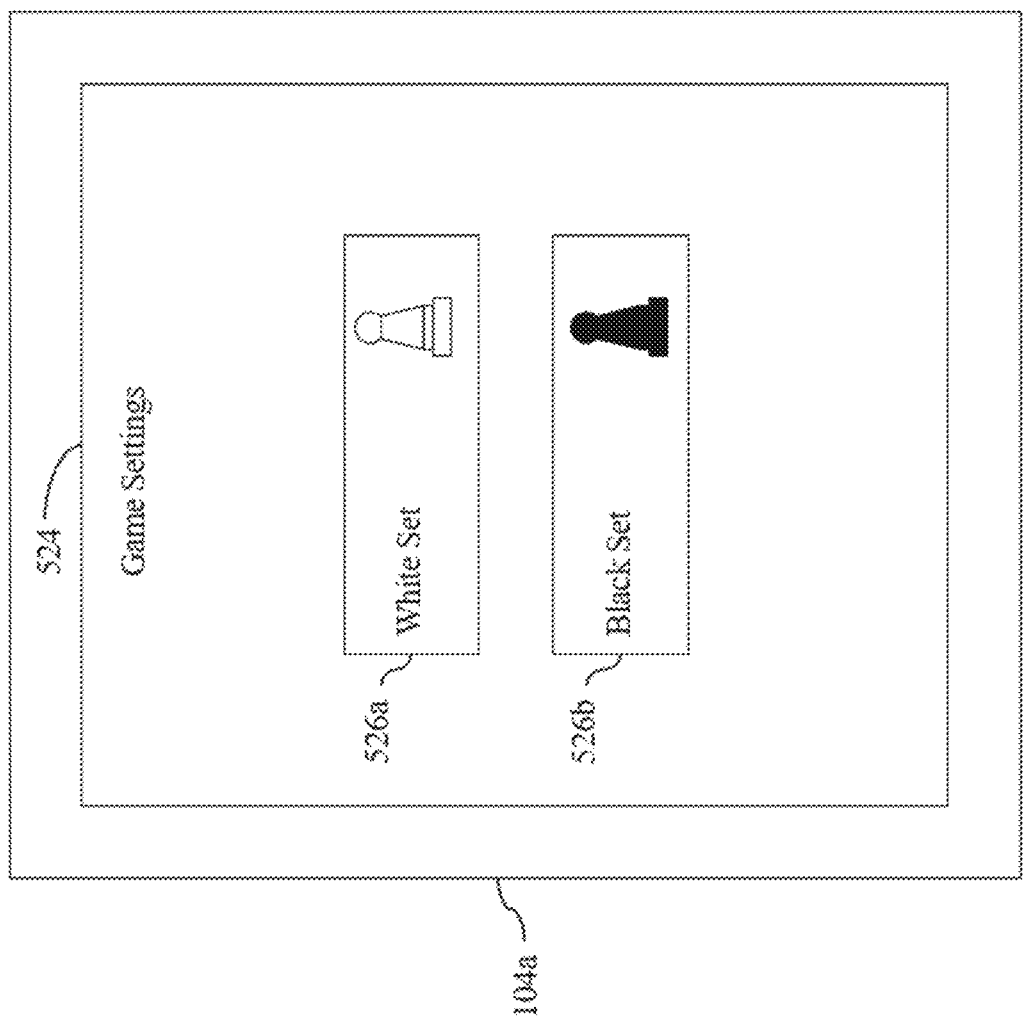

FIG. 5D illustrates the fourth UI 524 rendered on the first player device 104 a, in accordance with an embodiment of the disclosure. The server 108 renders the fourth UI 524 for selecting the black or white set of game pieces for playing the board game such as chess. The fourth UI 524 includes the twelfth and thirteenth options 526 a and 526 b for the white and black sets of game pieces, respectively. The twelfth option 526 a is the 'White Set' option that is selectable by the first player 102 a to play the board game with the white set of game pieces. The thirteenth option 526 b is the 'Black Set' option that is selectable by the first player 102 a to play the board game with the black set of game pieces.

Figure 5E:
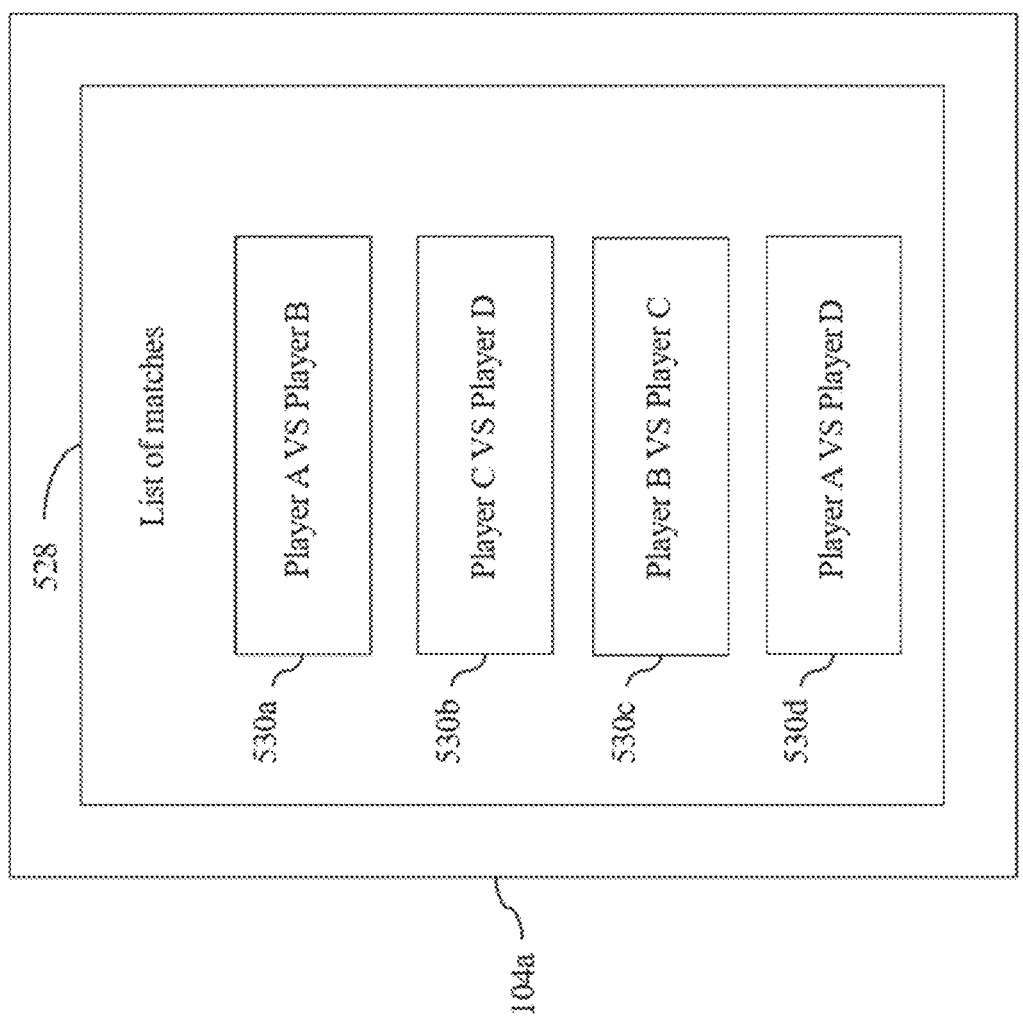

FIG. 5E illustrates the fifth UI 528 rendered on the first player device 104 a, in accordance with an embodiment of the disclosure. The server 108 renders the fifth UI 528 when the first player 102 a selects the third game mode. The fifth UI 528 presents a set of matches that are selectable by the first player 102 a. The fifth UI 528 includes fourteenth through seventeenth options 530 a-530 d for selecting a corresponding match. The fourteenth option 530 a corresponds to a first match played between a 'Player A' and a 'Player B'. The fifteenth option 530 b corresponds to a second match played between a 'Player C' and a 'Player D'. The sixteenth option 530 c corresponds to a third match played between the 'Player B' and the 'Player C'. The seventeenth option 530 d corresponds to a fourth match played between the 'Player A' and the 'Player D'. In an example, the first and second matches are live matches and the third and fourth matches are recorded matches.

It will be apparent to a person having ordinary skilled in the art that the scope of the disclosure is not limited to the rendering of the first through fifth UIs 502, 506, 510, 524, and 528. In various other embodiments of the disclosure, the UIs rendered on the first player device 104 a may vary in type and sequence. Further, the UIs rendered may vary based on a geographical location of the first player device 104 a, a type of the first player device 104 a, and the like.

Although the disclosure describes that the first through fifth UIs 502, 506, 510, 524, and 528 are rendered on the first player device 104 a, the scope of the disclosure is not limited to it. In various other embodiments, the first through fifth UIs 502, 506, 510, 524, and 528 may be rendered by the server 108 on the first game board 106 a, without deviating from the scope of the disclosure.

FIGS. 6A-6E, collectively, is a flow chart 600 illustrating a method for playing the board game on the first game board 106 a, in accordance with an embodiment of the disclosure. To initiate the board game, the first player 102 a switches ON the first game board 106 a by way of the switch 210. The first game board 106 a is powered ON by way of a battery or the external power supply circuit (i.e., a DC power supply or an AC power supply).

At step 602, the processor 302 connects the first game board 106 a to the first player device 104 a by way of the first communication network 110 a. The first player 102 a is presented with the first UI 502 on the first player device 104 a. The first UI 502 includes the first through fifth game modes that are selectable by the first player 102 a.

At step 604, the processor 302 determines whether the first game mode is selected by the first player 102 a. If at step 604, the processor 302 determines that the first game mode is selected by the first player 102 a, the match begins and step 606 is executed. The first player 102 a plays a move on the first game board 106 a. For the sake of ongoing discussion, it is assumed that the first player 102 *a* plays a valid move. The processor 302 records the move played by the first player 102 *a*, by way of the sensors 308. At step 608, the processor 302 transmits the move played by the first player 102 *a* to the first player device 104 *a* by way of the first communication network 110 *a*. The first player device 104 *a* communicates the move played by the first player 102 *a* to the second player device 104 *b*. In an embodiment, the second player device 104 *b* communicates the move played by the first player 102 *a* to the second game board 106 *b*. In another embodiment, the move played by the first player 102 *a* is displayed to the second player 102 *b* on the second player device 104 *b*. The second player 102 *b* replicates, on the second game board 106 *b*, the move played by the first player 102 *a*. Then, the second player 102 *b* plays a counter move on the second game board 106 *b*. The second game board 106 *b* transmits the counter move to the processor 302 by way of the second and first player devices 104 *b* and 104 *a*. At step 610, the processor 302 receives the counter move from the first player device 104 *a*. The first player 102 *a* replicates, on the first game board 106 *a*, the counter move played by the second player 102 *b* on the second game board 106 *b*. At step 612, the processor 302 determines whether the game has ended. If at step 612, the processor 302 determines that the game has not ended, step 606 is executed.

Figure 6A:
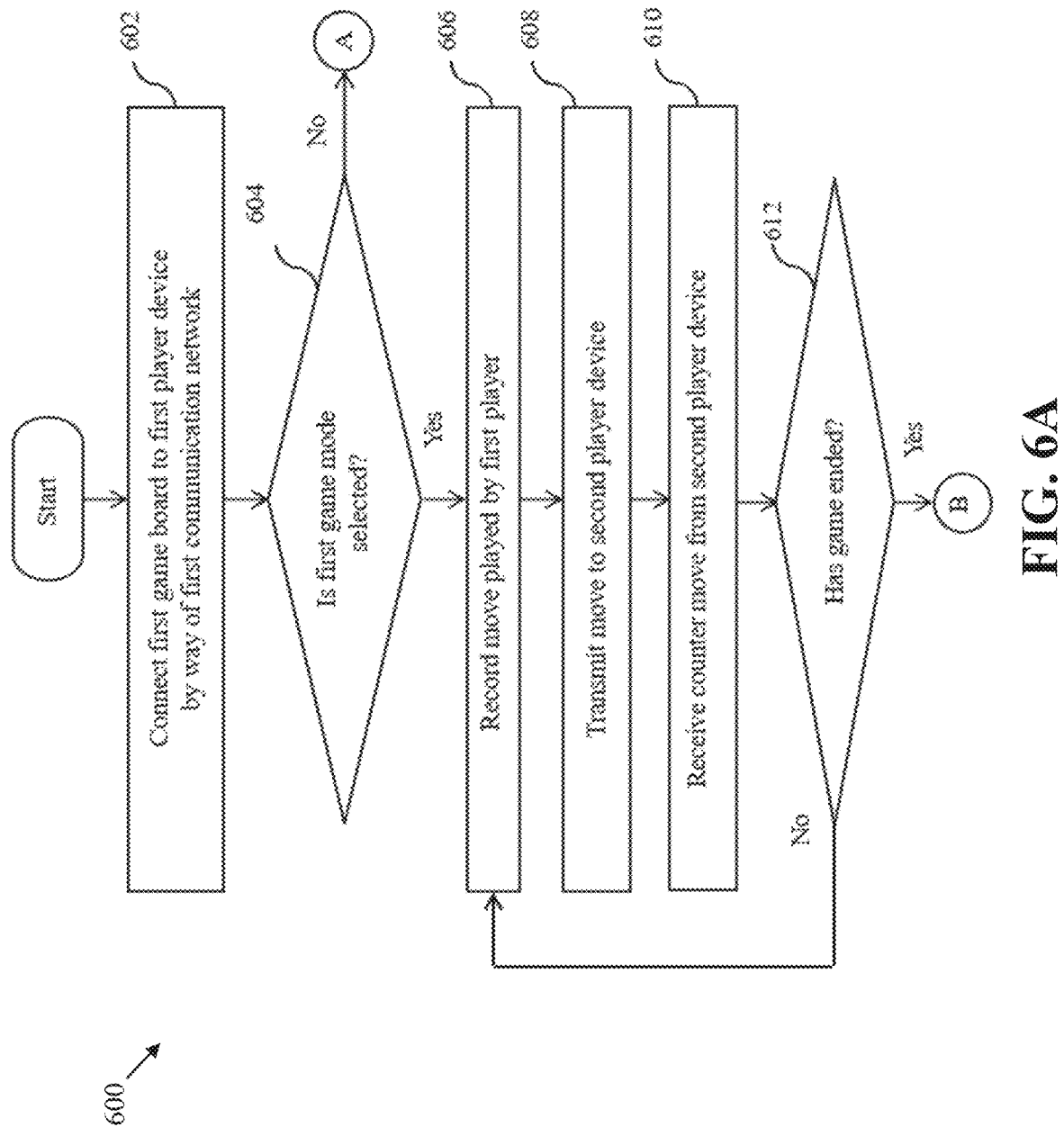
FIGS. 6A-6E, collectively, is a flow chart illustrating a method for playing a board game on the first game board, in accordance with an embodiment of the disclosure.
Figure 6B:
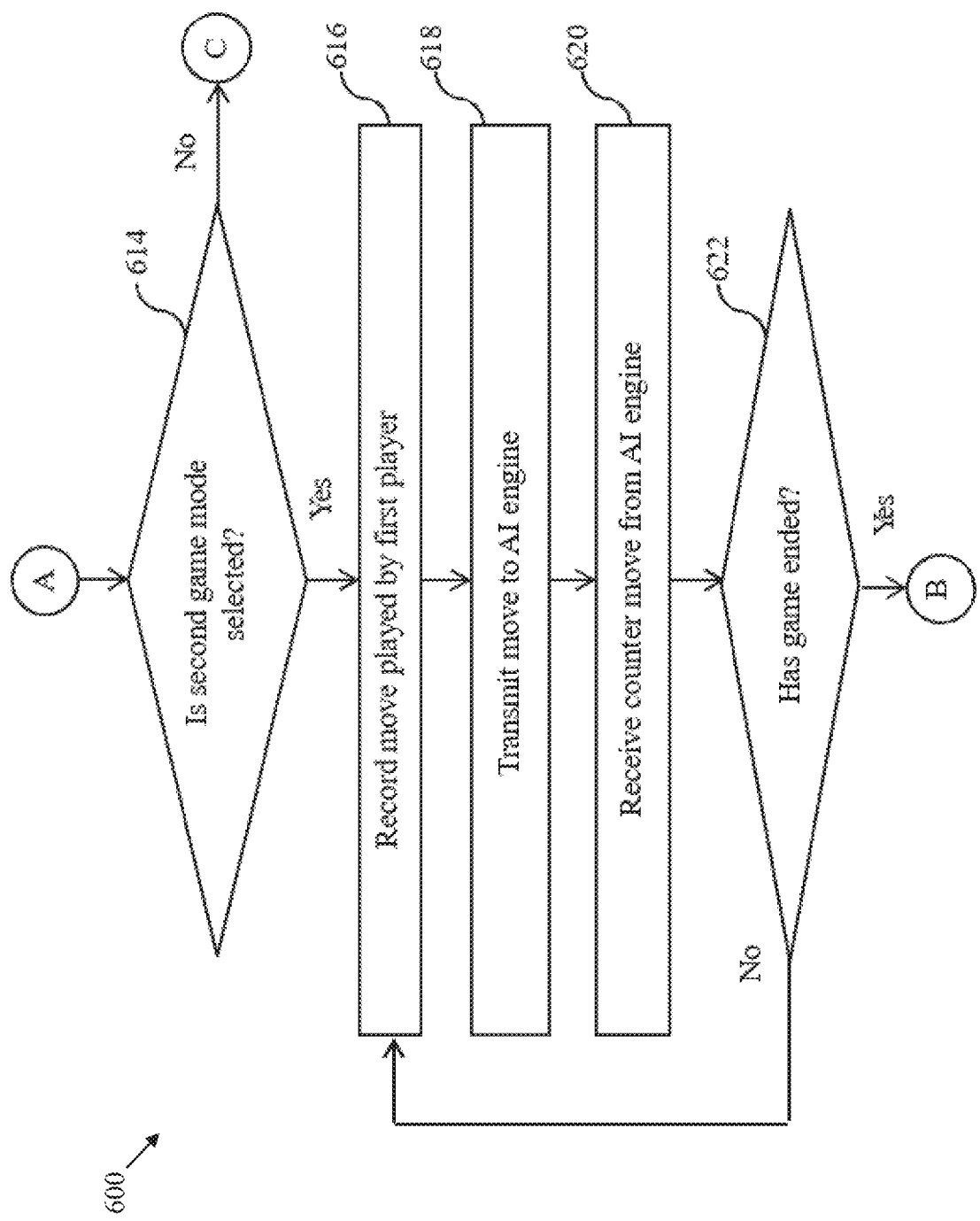

If at step 604, the processor 302 determines that the first game mode is not selected by the first player 102 *a*, step 614 is executed. Referring now to FIG. 6B, at step 614, the processor 302 determines whether the second game mode is selected by the first player 102 *a*. If at step 614, the processor 302 determines that the second game mode is selected by the first player 102 *a*, step 616 is executed. The game starts and the first player 102 *a* plays a move on the first game board 106 *a*. At step 616, the processor 302 records the move played by the first player 102 *a*, by way of the sensors 308. At step 618, the processor 302 transmits the move played by the first player 102 *a* to the AI engine by way of the first communication network 110 *a*. In an embodiment, the AI engine is on the first player device 104 *a*. The AI engine analyzes the move played by the first player 102 *a* and generates a counter move. At step 620, the processor 302 receives the counter move by way of the first player device 104 *a*. The first player 102 *a* replicates on the first game board 106 *a*, the counter move played by the AI player. At step 622, the processor 302 determines whether the game has ended. If at step 622, the processor 302 determines that the game has not ended, step 616 is executed.

Figure 6C:
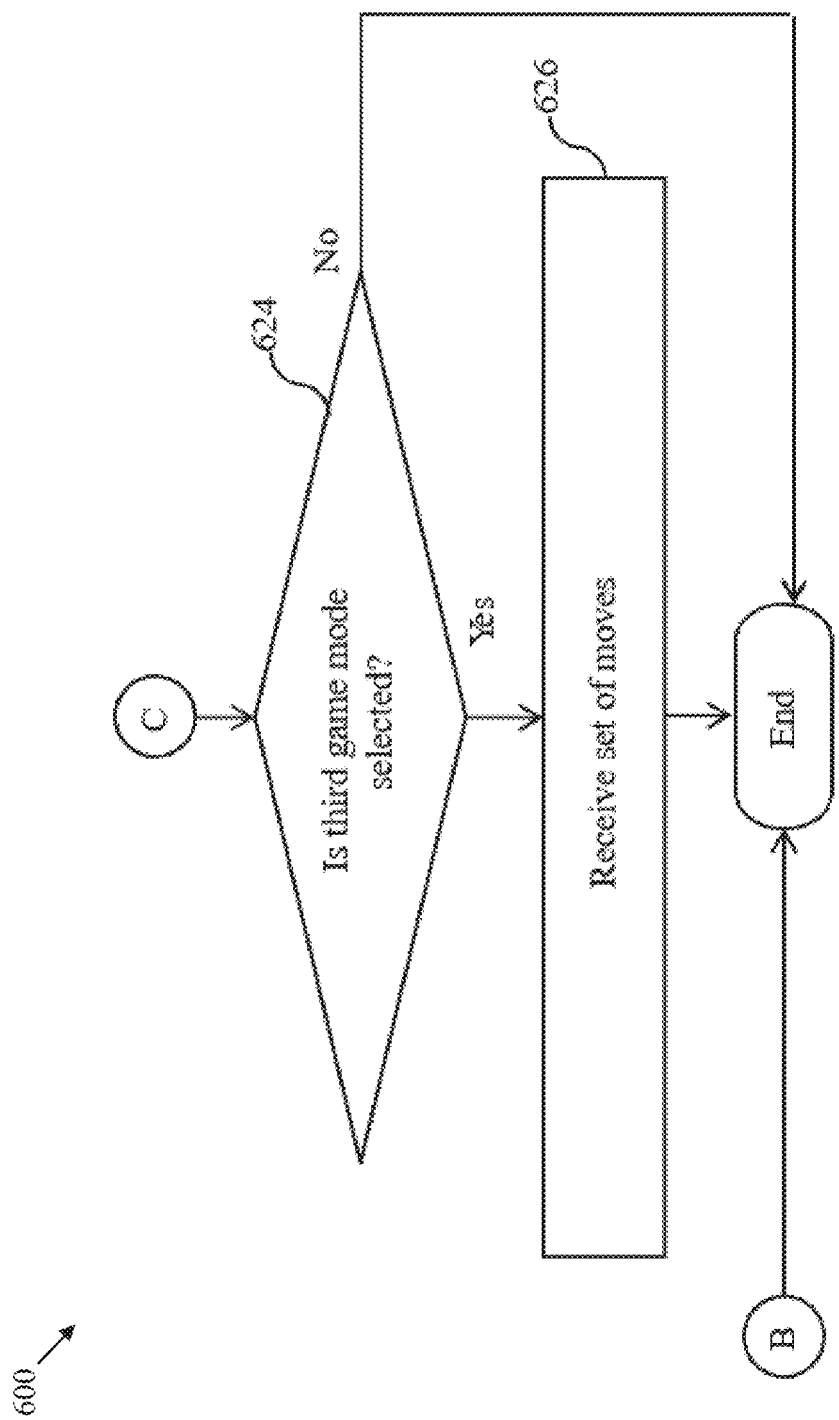

If at step 614, the processor 302 determines that the second game mode is not selected by the first player 102 *a*, step 624 is executed. Referring now to FIG. 6C, at step 624, the processor 302 determines whether the third game mode is selected by the first player 102 *a*. If at step 624, the processor 302 determines that the third game mode is selected by the first player 102 *a*, step 626 is executed. The server 108 renders the fifth UI 528 on the first player device 104 *a* presenting the set of available matches to the first player 102 *a* for selection. The first player 102 *a* selects a match from the set of available matches for streaming. The selection of the match by the first player 102 *a* is communicated to the server 108 by the first player device 104 *a*. At step 626, the server 108 transmits the set of moves associated with the selected match to the first player device 104 *a*. The first player device 104 *a* further transmits the set of moves to the processor 302. All the moves associated with the selected match are made by the first player 102 *a* based on indications from the indicators 310.

Figure 6D:
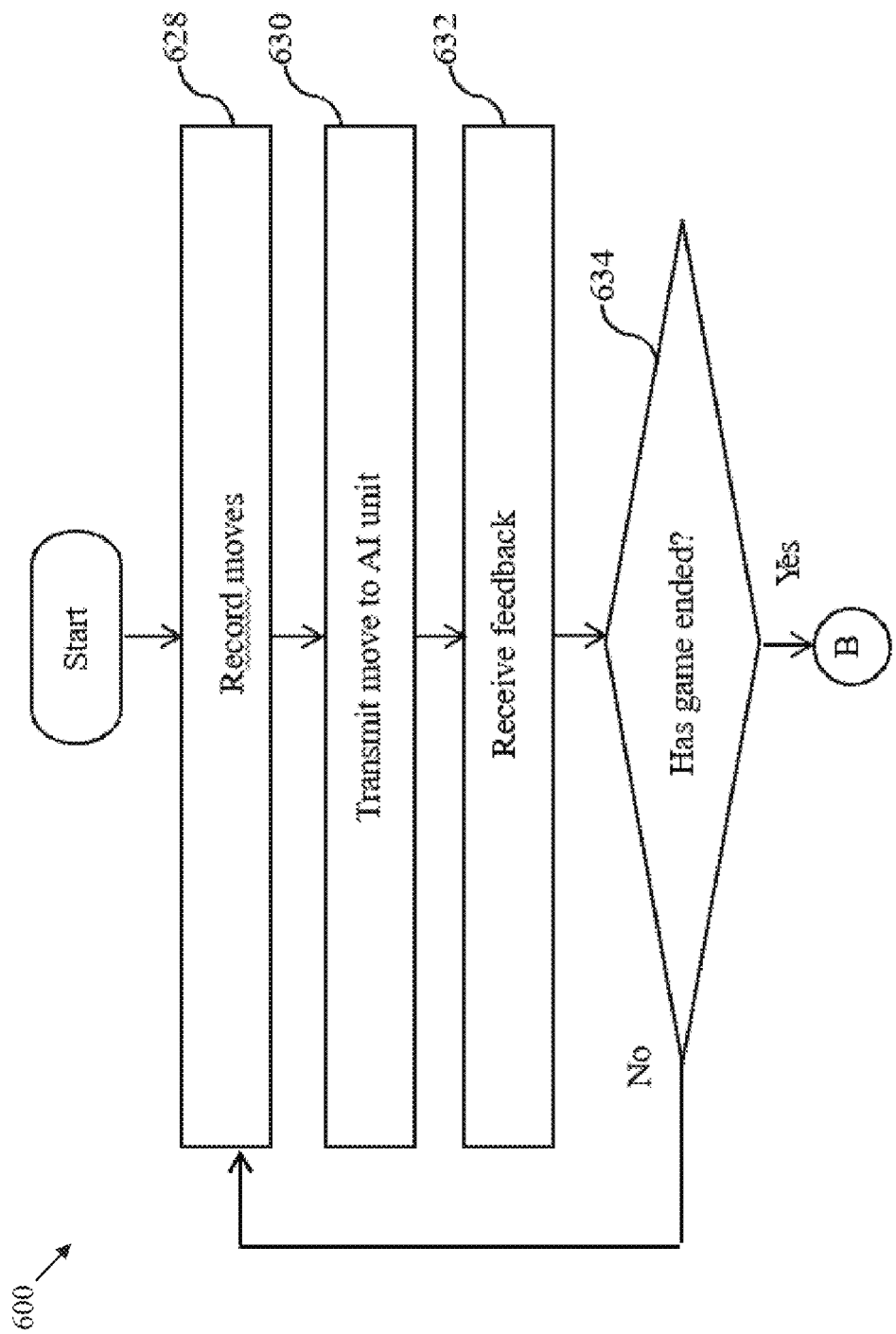
Figure 6E:
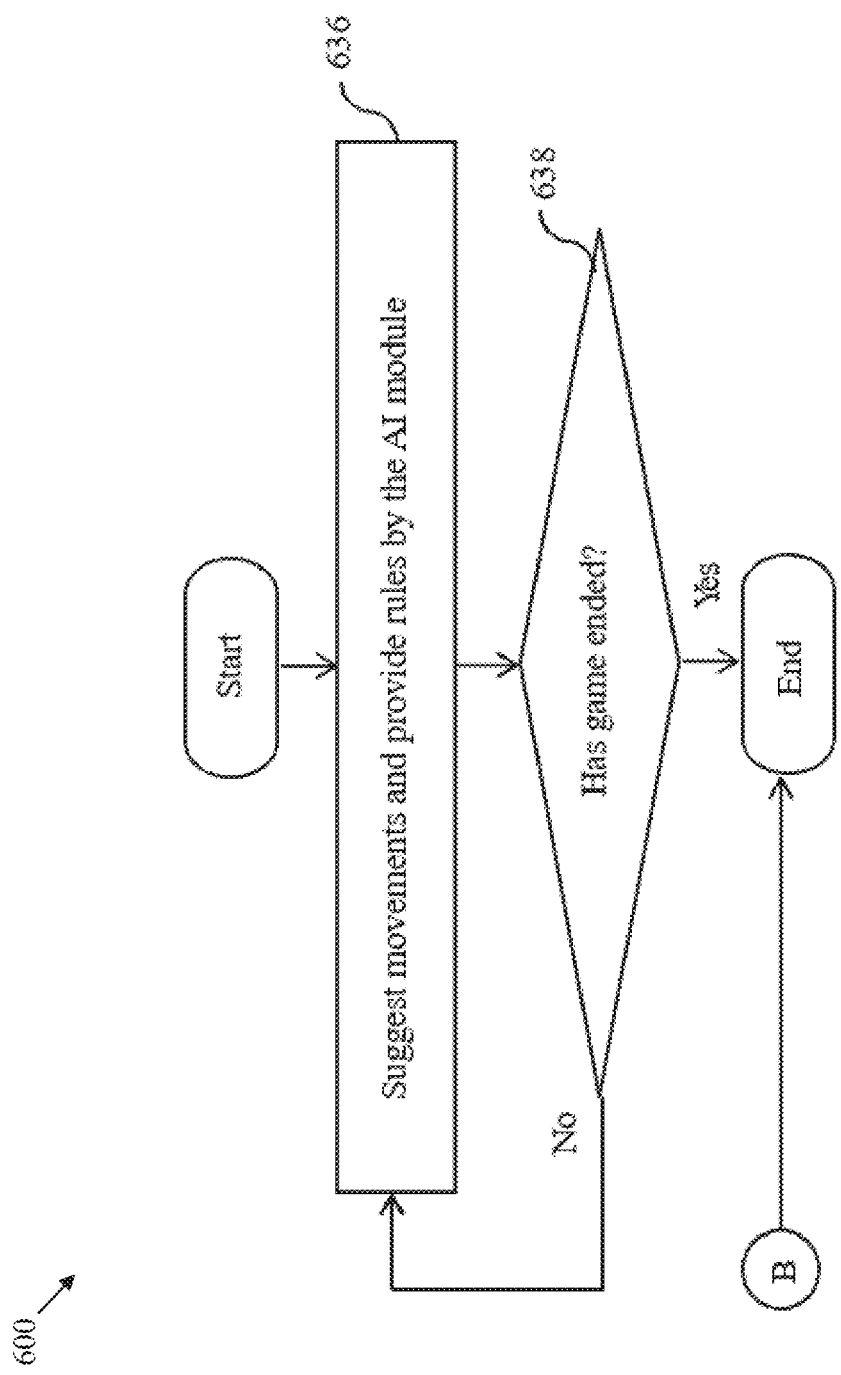

The method steps shown in FIG. 6D and FIG. 6E relate to fourth and fifth game modes, respectively. The fourth game mode can be selected in conjunction with any of the first, second, third and fifth game modes. The fifth game mode can be selected in conjunction with any of the first, second, third and fourth game modes. When the fourth game mode is selected, step 628 is executed. At step 628, the moves of the match are recorded by the first player device 104 *a* or the second player device 104 *b* or the first game board 106 *a* or the second game board 106 *b* or the server 108. At step 630, the AI unit associated with the fourth game mode analyzes the moves. At step 632, the players associated with the game (for example, the first and second players 102 *a* and 102 *b*) receive feedback on their performance from the AI unit through the first player device 104 *a* or the second player device 104 *b* or the first game board 106 *a* or the second game board 106 *b*. At step 634, the processor 302 determines whether the game has ended. If at step 634, the processor 302 determines that the game has not ended, step 628 is executed.

When the fifth game mode is selected, step 636 is executed. At step 636, match rules, valid moves of each game piece, next valid moves in a match are provided to the player (for example, the first player 102 *a*) by the AI module. At step 638, the processor 302 determines whether the game has ended. If at step 638, the processor 302 determines that the game has not ended, step 636 is executed.

It will be understood by a person having ordinary skill in the art that though only two game boards 106 are shown connected to each other, more than two game boards 106 can be connected to one another. It will be understood by a person having ordinary skill in the art that the first and second game boards 106 *a* and 106 *b* are not limited to the game of chess.

The first game board 106 *a* is made of a flexible material and include components that are flexible. The use of multiple flexible strips 306 or the use of a single flexible sheet adds to the flexibility of the first game board 106 *a*. Hence, the first game board 106 *a* can be folded and rolled and can be stored in an area smaller than the footprint of the first game board 106 *a* when not folded or rolled. In addition, the indicators 310, the sensors 308 and the control circuit 204 enable the first player 102 *a* to play the board game with an opponent player who is located remotely with respect to the first player 102 *a*. Additionally, the capability of a game board 106 (for example, the first game board 106 *a*) to connect to other game boards 106 (for example, the second game board 106 *b*) that are at a remote location enables hosting a tournament in which the players are located remotely with respect to other players.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure.

What is claimed is:

1. An electronic game board, comprising:
a processing circuit;
a play area onto which a plurality of game pieces are arranged for facilitating a game; and
a plurality of indicators in the play area, wherein at least one indicator of the plurality of indicators track and indicate an initial position on the play area of at least one game piece of the plurality of game pieces and an end position on the play area of the at least one game piece based on an input from the processing circuit, wherein the electronic game board is foldable and rollable, and wherein the plurality of indicators track and indicate movement of the at least one game piece between the initial position and the end position in real-time;

a plurality of sensors, wherein at least one sensor of the plurality of sensors generates a signal indicative of whether the at least one game piece is moved to the end position;

an Artificial Intelligence (AI) unit; and a communication module that is configured to establish communication between the electronic game board, and an AI engine or a second electronic game board, wherein the communication module enables:

the processing circuit to transmit the movement of the at least one game piece between the initial position and the end position to the AI engine or the second electronic game board in real-time;

the processing circuit to receive a counter movement from at least one of the AI engine or the second electronic game board, to synchronize the counter movement on the electronic game board; and the AI unit to activate at least one indicator of the plurality of indicators associated with the end position of the counter movement, and enable users to replicate the counter movement in the electronic game board.

2. The electronic game board of claim 1, wherein the plurality of indicators are divided in groups such that each group is a strip of indicators.

3. The electronic game board as claimed in claim 1, wherein the plurality of sensors are divided in groups such that each group of sensors is on a respective strip of indicators.

4. The electronic game board as claimed in claim 3, wherein each strip of indicators is a flexible Printed Circuit Board (PCB).

5. The electronic game board as claimed in claim 1, wherein the electronic game board is connected to a player device.

6. The electronic game board as claimed in claim 1, wherein the second electronic game board is located remotely with respect to the electronic game board.

7. The electronic game board as claimed in claim 1, further comprising an indicating unit to indicate that the at least one game piece is moved to a position on the play area different from the end position or the at least game piece is not moved to the end position within a predetermined time period.

8. The electronic game board as claimed in claim 1, wherein the plurality of sensors are at least one of electromagnetic devices, hall sensors, capacitive sensors, resistive sensors, surface optical wave sensors, and optical sensors.

9. The electronic game board as claimed in claim 1, wherein the move corresponds to at least one of a move played a game player located remotely with respect to the electronic game board, a move played by an artificial intelligence player, and a move associated with a match of the game.

10. The electronic game board as claimed in claim 1, wherein the electronic game board is a chess board.

11. The electronic game board as claimed in claim 1, wherein the plurality of indicator are light emitting diodes.

12. The electronic game board as claimed in claim 1, wherein the play area is made of at least one of fiber, plastic, silicone, rubber, polymer, cloth, fabric and rexine.

* * * * *